(12) United States Patent
Miura et al.

(10) Patent No.: US 6,470,911 B2
(45) Date of Patent: Oct. 29, 2002

(54) CHECK VALVE AND FUEL TANK WITH CHECK VALVE ATTACHED THERETO

(75) Inventors: Natsushi Miura, Aichi-ken (JP);
Hiroyuki Sato, Aichi-ken (JP);
Masayuki Nakagawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/837,383

(22) Filed: Apr. 19, 2001

(65) Prior Publication Data

US 2001/0013367 A1 Aug. 16, 2001

Related U.S. Application Data

(62) Division of application No. 09/479,938, filed on Jan. 10, 2000, now Pat. No. 6,296,014.

(30) Foreign Application Priority Data

Jan. 12, 1999 (JP) ................................................ 11-5487
Aug. 4, 1999 (JP) ............................................ 11-221140

(51) Int. Cl.[7] ................................................ F16K 17/04
(52) U.S. Cl. ........................ 137/592; 137/541; 137/543; 137/351; 137/15.18; 137/315.33
(58) Field of Search ............................. 137/15.18, 541, 137/543, 315.33, 592, 351

(56) References Cited

U.S. PATENT DOCUMENTS

| | | | |
|---|---|---|---|
| 4,148,338 A | * 4/1979 | Skoli | 137/543 |
| 4,741,369 A | 5/1988 | Dawson | 141/286 |
| 4,750,518 A | 6/1988 | Griffin et al. | 137/565 |
| 5,662,140 A | * 9/1997 | Rucker | 137/541 |
| 5,775,357 A | 7/1998 | Regna et al. | 137/43 |
| 5,850,851 A | * 12/1998 | Miura et al. | 137/583 |
| 6,012,599 A | 1/2000 | Miura | 220/86.2 |
| 6,305,408 B1 | * 10/2001 | Goto et al. | 137/351 |

FOREIGN PATENT DOCUMENTS

| | | |
|---|---|---|
| JP | 8-268092 | 10/1996 |
| JP | 10-119594 | 5/1998 |

\* cited by examiner

*Primary Examiner*—A. Michael Chambers
(74) *Attorney, Agent, or Firm*—Pillsbury Winthrop LLP

(57) ABSTRACT

A check valve attached to an inner wall of a main body of a fuel tank ensures a sufficient seal of the main body from outside, without increasing the required number of parts. The check valve communicates with a fuel conduit of a fuel inlet pipe and functions to prevent liquid fuel and fuel vapor in the main body from flowing through the fuel inlet pipe and being released to the outside. The check valve is opened by a flow of fuel in the fuel inlet pipe and allows the flow of fuel to be introduced into the main body. The check valve includes a casing with a fuel outlet, a valve disc, and a fixation plate. The valve disc is movable between an open position and a closed position to open and close the fuel outlet of the casing. The fixation plate has one end inserted in an end of the casing and the other end welded to the main body. This arrangement enables the main body to be securely sealed from the outside.

6 Claims, 12 Drawing Sheets

CHECK VALVE AND FUEL TANK WITH CHECK VALVE ATTACHED THERETO

This application is a divisional of U.S. application Ser. No. 09/479,938, filed Jan. 10, 2000, now U.S. Pat. No. 6,296,014.

BACKGROUND OF THE INVENTION

1. Field of the Invention

The present invention relates to fuel tanks having a check valve attached thereto, and more particularly, a check valve attached to a main body of a fuel tank.

2. Description of the Related Art

In a fuel tank of an automobile, a check valve is attached to a main body of the fuel tank in order to prevent liquid fuel and fuel vapors in the main body of the fuel tank from flowing back and being released to the outside during fueling. A conventional check valve has a rather complicated structure to attach the check valve to an inner wall of the main body of the fuel tank.

SUMMARY OF THE INVENTION

The object of the present invention is to provide a check valve having sufficient sealing properties with a simple structure as well as to provide a fuel tank with the check valve.

At least part of the above and the other related objects are attained by a first check valve that is attached to an inner wall of a main body of a fuel tank. The first check valve includes a casing having a fuel inlet and fuel outlet through which a supply of fuel is ejected from the valve casing to the main body; a valve disc for opening the fuel outlet only when sufficient fuel pressure is applied to the valve disc from the fuel inlet pipe; and, a fixation plate surrounding the casing and having an inner end and an outer end for hermetically sealing the main body. The inner end of the fixation plate is inserted through insert molding into an end of casing, and the outer end is arranged to be welded to the inner wall of the main body.

The first check valve of the present invention, which is attached to the inner wall of the main body, is set to the open position by a flow of fuel injected through the fuel inlet pipe, and accordingly, enables the flow of fuel to enter the main body. When no fuel is supplied, the valve disc of the check valve is kept in the closed position to close the fuel outlet of the casing, and thereby, prevent the liquid fuel and fuel vapors in the main body from flowing back and being released to the outside.

The check valve is attached to the inner wall of the main body via the fixation plate by welding. The fixation plate has an inner end inserted through insert molding into the main body. The fixation plate seals the main body from the fuel inlet pipe and the outside, thereby special sealing elements, such as O rings, are not required and reducing the total number of parts.

Having the fixation plate, which is inserted through insert molding into the end of casing, integrated with the casing simplifies the process of attaching the check valve to the main body.

In accordance with one preferred embodiment of the present invention, the flange of the casing has a ring-shaped seal projection that is protruded to surround the fuel outlet. The ring-shaped seal projection is pressed against and jammed to a side wall of the main body, thereby ensuring a seal of the main body from the fuel inlet pipe. This simple structure enhances the seal between the flange and the side wall of the main body.

It is preferable that the fixation plate has a handle, which is arranged on a circumference thereof to hold the check valve during attachment of the check valve to the main body. The hold facilitates the attachment of the check valve to the inner wall of the main body.

It is also preferable that the check valve include a spring that presses the valve disc to the closed position.

In accordance with another preferred embodiment of the present invention, the casing has a seat, and the valve disc includes a valve element that is seated on the seat in the closed position and removed from the seat in the open position to close and open the fuel outlet; an arm linked with the valve element; and an attachment that is connected with the arm and is formed to attach the valve disc to the casing. The valve element, the arm, and the attachment are integrally formed from a thin plate having elasticity. The arm is designed to press the valve element against the seat to cause the valve element to be seated on the seat in the closed position. The arm causes the valve element to be removed from the seat and thereby sets the valve element in the open position when the valve element receives a pressure of a flow of fuel applied thereto at a time of fueling.

The present invention is also directed to a first fuel tank including a main body, in which fuel is kept, and a fuel inlet pipe, which is connected to the main body and through which a supply of fuel is flown into the main body. The first fuel tank is provided with a check valve that is attached to an inner wall of the main body and is connected to a fuel conduit of the fuel inlet pipe. The check valve prevents liquid fuel and fuel vapors in the main body from flowing through the fuel inlet pipe and being released to outside. The check valve is opened by a flow of fuel in the fuel inlet pipe to allow the flow of fuel to be introduced into the main body. The check valve includes a valve chest connected to the fuel inlet pipe; a casing with a fuel outlet, through which a supply of fuel is ejected from the valve chest to the main body; a valve disc that is movable between an open position and a closed position, so as to open and close the fuel outlet; and a fixation plate that is formed to seal the main body from outside and fix the valve disc in the main body. The fixation plate has one end inserted in an end of the casing, which forms a flange, and the other end welded to the inner wall of the main body.

The arrangement of the first fuel tank facilitates the attachment of the first check valve to the fuel tank.

The present invention is further directed to a second check valve that is attached to an inner wall of a main body of a fuel tank, in which fuel is kept, and that is arranged in the vicinity of a fuel outlet of a fuel inlet pipe, through which a supply of fuel is ejected into the main body. The second check valve includes a fixation member that has a seat designed to surround the fuel outlet and is formed to fix the check valve to the inner wall of the fuel tank; and a valve plate that is attached to the fixation member and is movable between an open position and a closed position to open and close the fuel outlet. The valve plate includes a valve element that is seated on the seat in the closed position and removed from the seat in the open position, so as to close and open the fuel outlet; an arm linked with the valve element; and an attachment that is connected with the arm and is formed to attach the valve disc to the casing. The valve element, the arm, and the attachment are integrally formed from a thin plate having elasticity. The arm is designed to press the valve element against the seat to cause the valve element to be seated on the seat in the closed position. The arm causes the valve element to be removed from the seat and thereby sets the valve element in the open position when the valve element receives a pressure of a flow of fuel applied thereto at a time of fueling.

In the second check valve of the present invention, the valve plate attached to the fixation member is movable between the open position and the closed position in order to open and close the fuel outlet of the fuel inlet pipe. The valve plate is made of a thin plate having elasticity and includes the valve element, the arm, and the attachment, which are integrally formed. The valve plate is attached to the fixation member by means of the attachment, which is linked with the valve element via the arm. The arm functions as a spring that applies a pressing force in the direction of seating the valve element onto the seat. When the valve element receives a force of a flow of fluid applied thereto, the arm inclines the valve element to open the fuel outlet of the fuel inlet pipe. Since the arm presses the valve element against the seat, the check valve ensures a sufficient seal in the closed position.

The second check valve of the above configuration is not attached to the fuel inlet pipe, but is directly attached to the inner wall of the main body by the fixation member. This arrangement enables the check valve not to be tubular, but flat in shape, thereby simplifying the structure of the fixation member. The fixation member, which is formed to support the thin valve plate, needs a relatively thin wall thickness.

The second check valve includes the thin valve plate and does not require any spring to move the valve plate between the open position and the closed position or any mechanism for setting the spring. This arrangement simplifies the structure of the check valve.

In accordance with one preferred embodiment of the present invention, the valve element is formed in a disc shape, and the arm is arranged on a circumference of the valve element.

In accordance with another preferred embodiment of the present invention, the fixation member has a circular protection step, which surrounds a circumference of the seat and protrudes inward in the main body to protect the valve element. The circular protection step effectively prevents the elastic thin valve plate from being deformed during attachment of the check valve to the inner wall of the main body.

In one method for attaching the valve plate to the fixation member, the valve plate has a claw obtained by cutting and bending part of the attachment. The fixation member has an engagement recess, which receives the attachment of the valve plate inserted therein, and an engagement aperture, which is formed in the vicinity of the engagement recess. Insertion of the attachment into the engagement recess causes the claw to be fit in the engagement aperture so that the valve plate is attached to the fixation member.

In another method for attaching the valve plate to the fixation member, the attachment of the valve plate is welded and fixed to the fixation member.

In still another method for attaching the valve plate to the fixation member, the attachment has a lower extension bent to surround a circumference of the fixation member. In this application, the attachment is attached to the fixation member by the lower extension.

In accordance with still another preferred embodiment of the present invention, the fixation member has an attachment pawl, which engages with the inner wall of the main body to attach the fixation member to the main body, and a valve pawl, which engages with the attachment of the valve plate to attach the valve plate to the fixation member. This arrangement enables the fixation member to be attached to the main body without welding so that the main body may be made of a resin.

The present invention is also directed to a second fuel tank including a main body, in which fuel is kept, and a fuel inlet pipe, which is connected to the main body and through which a supply of fuel is flown into the main body. The second fuel tank is provided with a check valve that is attached to an inner wall of the main body and is connected to a fuel conduit of the fuel inlet pipe. The check valve prevents liquid fuel and fuel vapor in the main body from flowing through the fuel inlet pipe and being released to outside. The check valve is opened by a flow of fuel in the fuel inlet pipe to allow the flow of fuel to be introduced into the main body. The check valve includes a fixation member that has a seat designed to surround a fuel outlet of the fuel inlet pipe and is formed to fix the check valve to the inner wall of the fuel tank; and a valve plate that is attached to the fixation member and is movable between an open position and a closed position to open and close the fuel outlet. The valve plate has a valve element that is seated on the seat in the closed position and removed from the seat in the open position to close and open the fuel outlet; an arm linked with the valve element; and an attachment that is connected with the arm and is formed to attach the valve disc to the casing. The valve element, the arm, and the attachment are integrally formed from a thin plate having elasticity. The arm is designed to press the valve element against the seat to cause the valve element to be seated on the seat in the closed position. The arm causes the valve element to be removed from the seat and thereby sets the valve element in the open position when the valve element receives a pressure of the flow of fuel applied thereto during fueling.

The arrangement of the second fuel tank facilitates the attachment of the second check valve to the fuel tank.

These and other objects, features, aspects, and advantages of the present invention will become more apparent from the following detailed description of the preferred embodiments with the accompanying drawings.

DESCRIPTION OF THE CURRENTLY PREFERRED EMBODIMENTS OF THE PRESENT INVENTION

Figure 1:
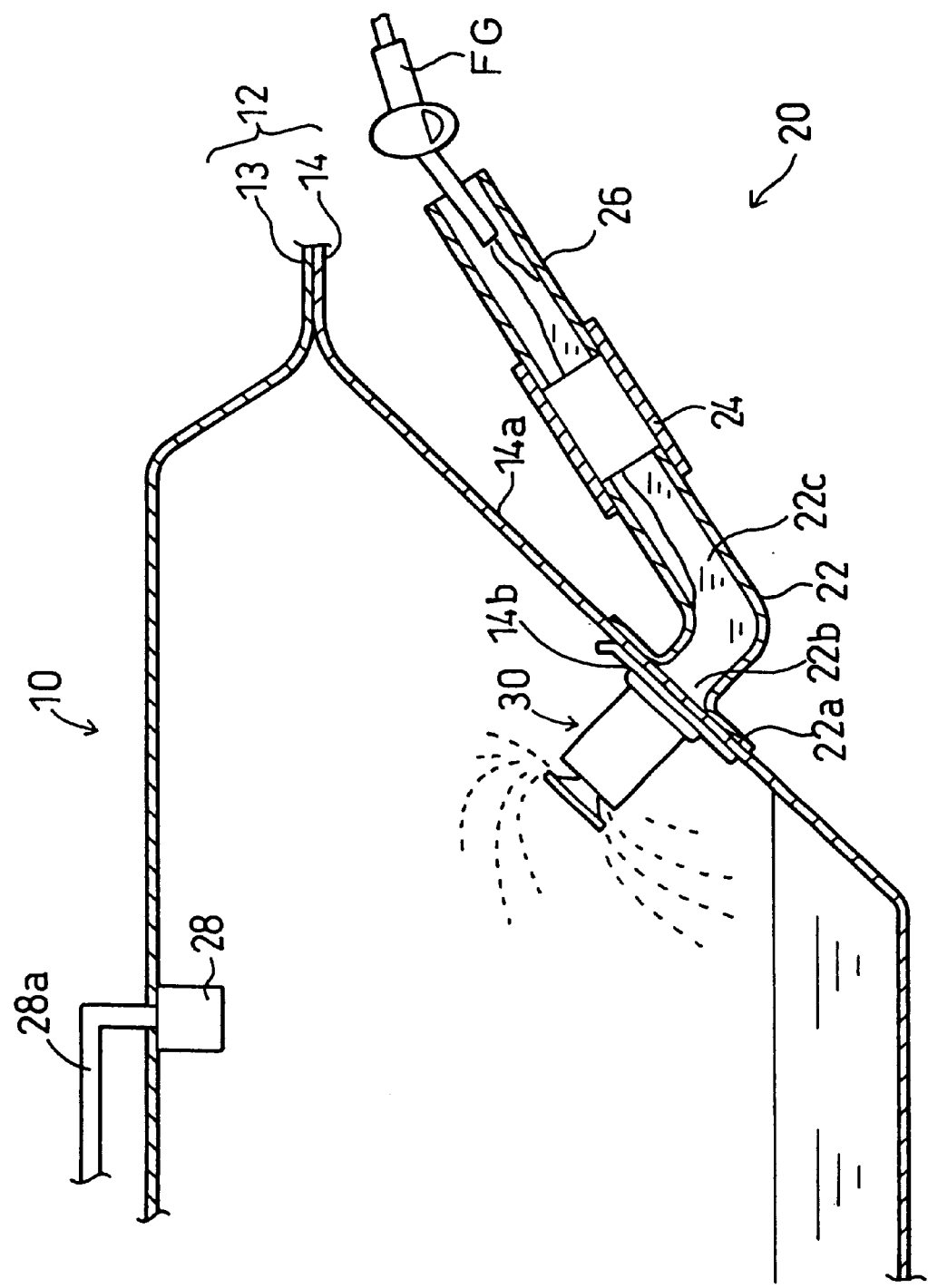
FIG. 1 schematically illustrates a fuel tank of an automobile with a check valve of a first embodiment according to the present invention.

FIG. 1 schematically illustrates a fuel tank 10 of an automobile. Referring to FIG. 1, the fuel tank 10 includes a main body 12, in which fuel is kept, and a fueling mechanism 20 that functions as the fuel inlet pipe of the present invention to fill the main body 12 with a supply of fuel. The main body 12 is made of zinc-plated steel and includes an upper tank section 13 and a lower tank section 14, which are joined with each other to form an integral body. The fueling mechanism 20 includes an inlet lower pipe 22 welded to a side wall 14a of the lower tank section 14, an inlet hose 24 having one end open to receive a first end of the inlet lower pipe 22 fitted therein, an inlet filler pipe 26 fit in the second end of the inlet hose 24, and a filler cap (not shown) covering a filler opening of the inlet filler pipe 26.

The second end of the inlet lower pipe 22 forms a flange 22a, which is attached to an opening 14b formed in the side wall 14a of the lower tank section 14. A check valve 30 is attached to an inner wall of the lower tank section 14 to face an outlet 22b defined by the second end of the inlet lower pipe 22. The check valve 30 is set in an open position during fueling and is otherwise kept in a closed position. A fuel cut-off valve 28 is disposed in an upper portion of the main body 12. The fuel cut-off valve 28 is connected to a canister (not shown) via a conduit 28a.

In the fueling mechanism 20 of the above configuration, when a supply of fuel is fed from a filler gun FG to the inlet filler pipe 26 with the filler cap opened, the supply of fuel flows through the inlet hose 24 and the inlet lower pipe 22 to the check valve 30 and opens the check valve 30 to flow into the main body 12. The check valve 30 is kept in the closed position, except during fueling. Even when the filler cap is removed accidentally, the check valve 30 thus effectively prevents the liquid fuel and fuel vapors in the main body 12 from flowing back and being released to the outside.

Figure 2:
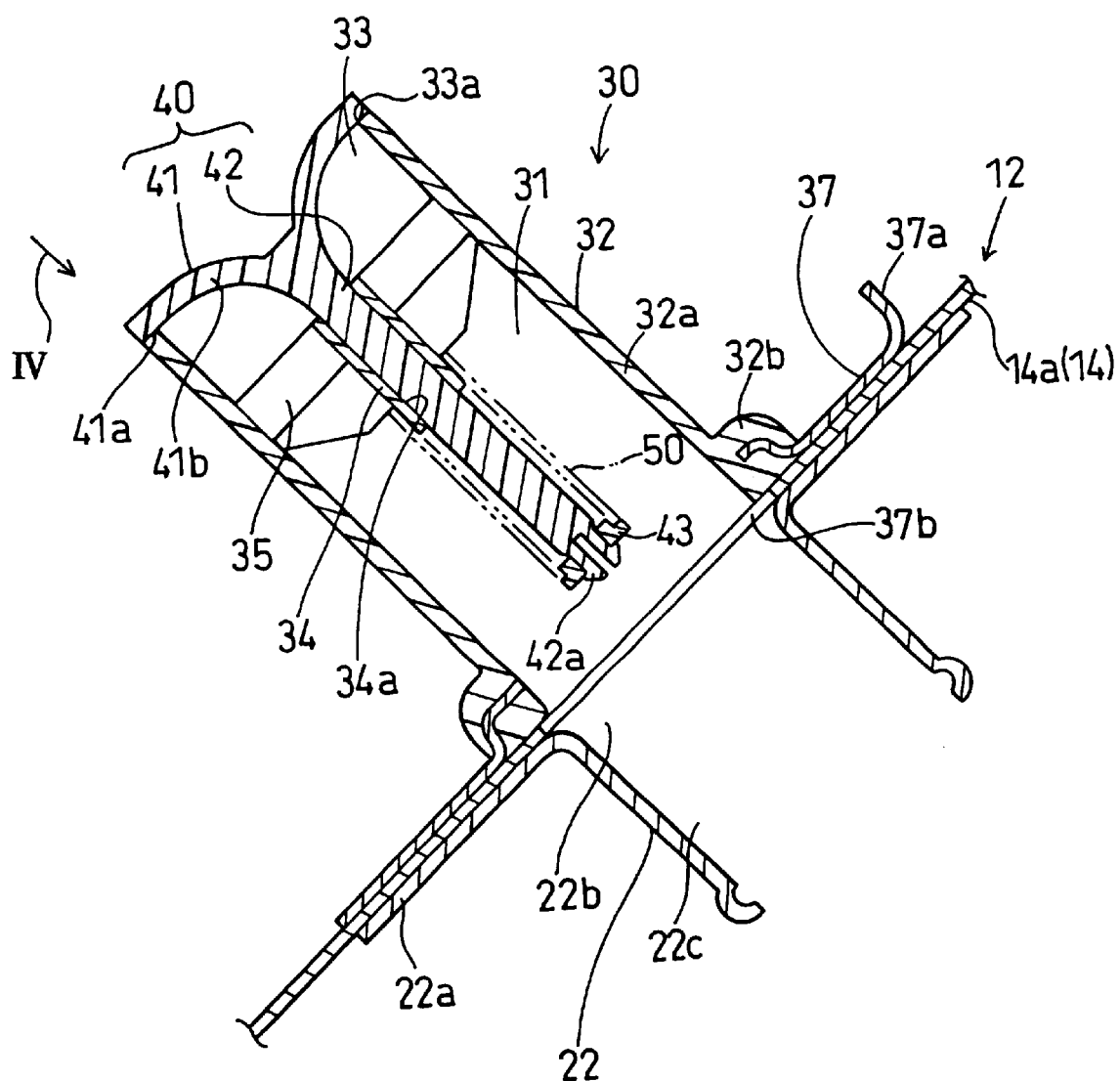
FIG. 2 is a sectional view illustrating the check valve of the embodiment in a closed position.
Figure 3:
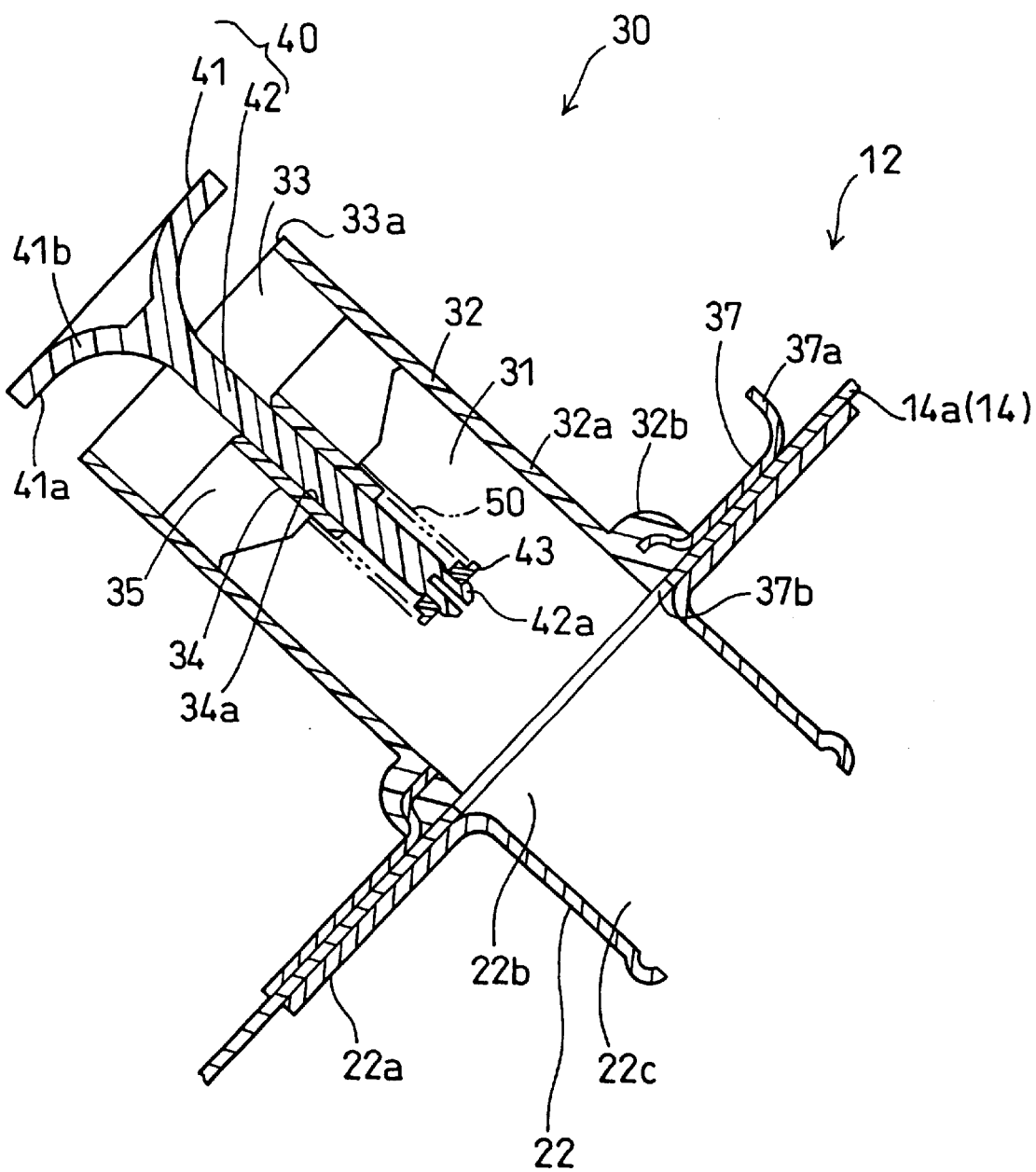
FIG. 3 is a sectional view illustrating the check valve of the embodiment in an open position.
Figure 4:
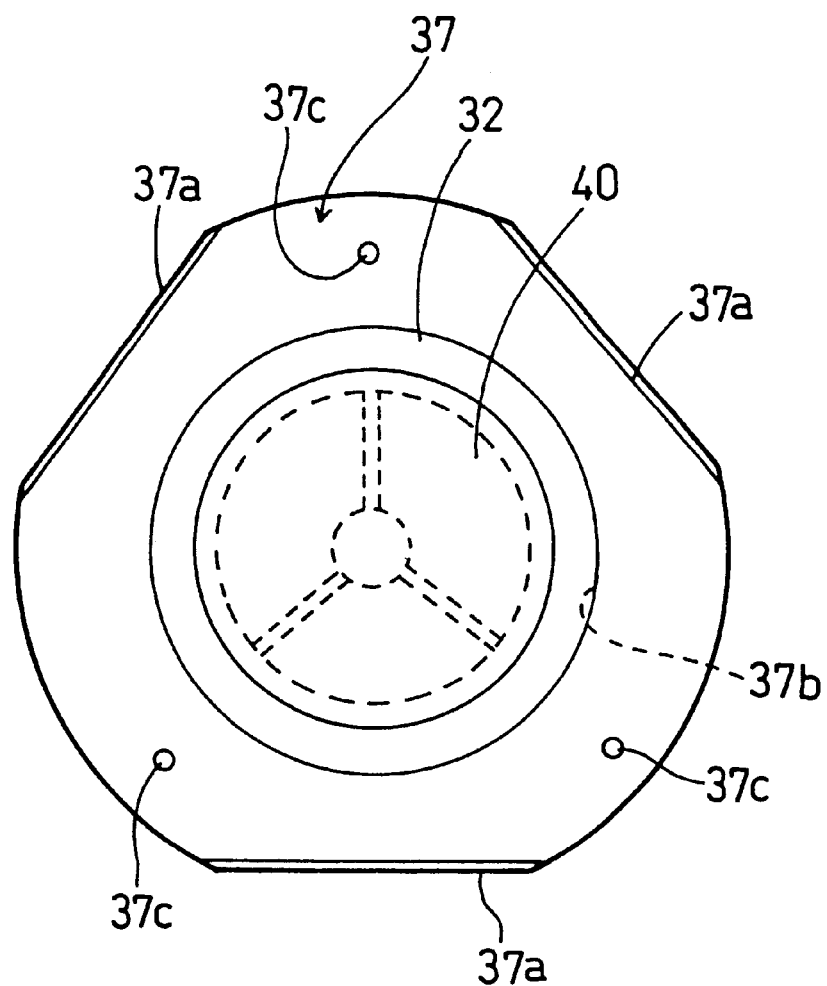
FIG. 4 illustrates the check valve of the embodiment from the perspective of an arrow IV of FIG. 2.

The following describes the structure and the operation of the check valve 30 in detail. FIG. 2 is a sectional view illustrating the check valve 30 in the closed position; FIG. 3 is a sectional view illustrating the check valve 30 in the open position; and FIG. 4 illustrates the check valve 30 seen from an arrow IV of FIG. 2. Referring to FIGS. 2 through 4, the check valve 30 has a casing 32 that defines a valve chest 31 connecting with a fuel conduit 22c of the inlet lower pipe 22, a fixation plate 37, a valve disc 40, and a spring 50 as primary constituents.

The casing 32 includes a cylindrical side wall 32a and defines the valve chest 31 therein. One end of the side wall 32a forms a flange 32b where the fixation plate 37 is inserted and attached. The fixation plate 37 is a doughnut-shaped plate having an inner hole 37b, as shown in FIG. 4. The fixation plate 37 is made of zinc-plated steel like the main body 12 and has three handles 37a obtained by bending the circumference of the fixation plate 37 at three different places. The three handles 37a are held by fixtures for attaching the check valve 30 to the main body 12 as discussed later. The circumference of the inner hole 37b in the fixation plate 37 is inserted into the flange 32b of the casing 32 and is thereby integrated with the casing 32. The fixation plate 37 is designed to have a smooth plane that comes into close contact with the side wall 14a of the main body 12, and is attached to the side wall 14a of the main body 12 by spot welding at three welding points 37c. The side wall 14a of the main body 12 is inclined relative to the vertical direction so that the check valve 30 is arranged obliquely upward.

Referring back to FIG. 2, the other end of the casing 32 forms a fuel outlet 33 that is opened and closed by the valve disc 40. The valve disc 40 has a valve element 41 and a shaft 42 formed integrally with the valve element 41. The valve element 41 has a seating portion 41a, which is seated on and removed from a mating seat 33a of the fuel outlet 33 to close and open the fuel outlet 33. A flare portion 41b is formed integrally with the seating portion 41a. The flare portion 41b flares in order to cause the supply of fuel flowing through the valve chest 31 to be ejected from the fuel outlet 33 to a wider area.

The valve disc 40 is supported by a valve support 34 and three linkage elements 35 of the casing 32 via the shaft 42 thereof to be movable between the open position and the closed position. The three linkage elements 35 and the valve support 34 are disposed in the valve chest 31 of the casing 32 to support the valve disc 40. The three linkage elements 35 are arranged radially at the intervals of 120 degrees, and the flow of fuel passes through the spaces between the adjoining linkage elements 35. The valve support 34 is integrated with a central joint of the three linkage elements 35 and has a valve support aperture 34a. The shaft 42 of the valve disc 40 passes through the valve support aperture 34a of the valve support 34 so that the valve disc 40 is supported in a movable manner by the casing 32. A free end of the shaft 42 forms a snap fit 42a, which engages with a spring stopper 43 in an elastic manner.

The spring 50, which presses the valve disc 40, is set on the shaft 42 and spans between the valve support 34 and the spring stopper 43. The assembly of the check valve 30 inserts the shaft 42 of the valve disc 40 into the valve support aperture 34a of the valve support 34, sets the spring 50 on the shaft 42 of the valve disc 40, and causes the snap fit 42a of the shaft 42 to engage with the spring stopper 43.

In the closed position, the check valve 30 of the above structure effectively prevents the liquid fuel and fuel vapors in the main body 12 from flowing back through the inlet lower pipe 22 and being released to the outside. During fueling, the supply of fuel, which is fed through the inlet filler pipe 26, the inlet hose 24, and the inlet lower pipe 22, flows through the fuel conduit 22c into the valve chest 31 of the check valve 30 to reach the valve disc 40. When the force of flow of fuel applied to the valve disc 40 exceeds the pressing force of the spring 50, the valve disc 40 moves to its open position to enable the flow of fuel to enter the main body 12. The flare portion 41b of the valve disc 40 spreads out the flow of fuel, which is accordingly sprayed over a wide space in the main body 12. The flow of cold fuel lowers the saturated vapor pressure in the main body 12 and prevents the fuel vapors from being released to the outside during fueling.

The following describes a process of attaching the check valve 30 to the inner wall of the main body 12. While the upper tank section 13 and the lower tank section 14 are not joined with each other, the lower tank section 14 is positioned on a work table (not shown). The three handles 37a of the fixation plate 37 are held by the fixtures, and the check valve 30 is set on the outlet 22b of the inlet lower pipe 22. The three welding points 37c arranged between the adjoining handles 37a on the circumference of the fixation plate 37 are spot welded to the lower tank section 14 so that the check valve 30 is attached to the inner wall of the main body 12.

Since the fixation plate 37 of the check valve 30, which is attached to the main body 12 in the above manner, is inserted in the end of the casing 32. This arrangement ensures a sufficient seal between the fixation plate 37 and the casing 32. The smooth plane of the fixation plate 37 is in close contact with the inner wall of the main body 12 by spot welding to ensure a sufficient seal between the fixation plate 37 and the main body 12. The fixation plate 37 accordingly enables the main body 12 to be sufficiently sealed from the fueling mechanism 20 and from the outside. This arrangement makes any special sealing elements, such as O rings, unrequired, thereby desirably reducing the total number of parts.

Since the fixation plate 37 is inserted into and thereby integrated with the casing 32 in the course of injection molding, the integrated part simplifies the process of attachment of the check valve 30 to the main body 12.

The configuration of the embodiment discussed above may be modified, changed, or altered in various ways without departing from the scope or spirit of the main characteristics of the present invention.

Figure 5:
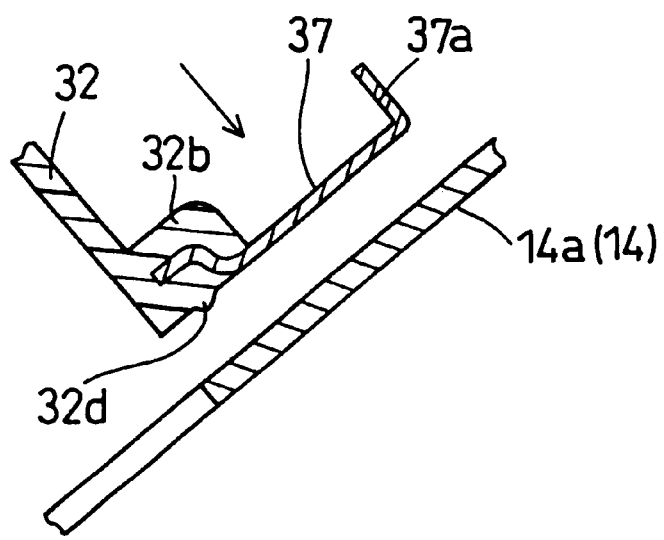
FIG. 5 shows a fixation plate of the check valve having a modified structure.

By way of example, FIG. 5 shows the fixation plate 37 having a modified structure. A ring-shaped seal projection 32d formed around the whole circumference of the flange 32b protrudes from an end plane of the flange 32b. The seal projection 32d is designed to allow elastic deformation. The seal projection 32d is pressed against and thereby jammed to the side wall 14a of the main body 12 to enhance the seal of the main body 12 from the fuel conduit 22c.

Figure 6:
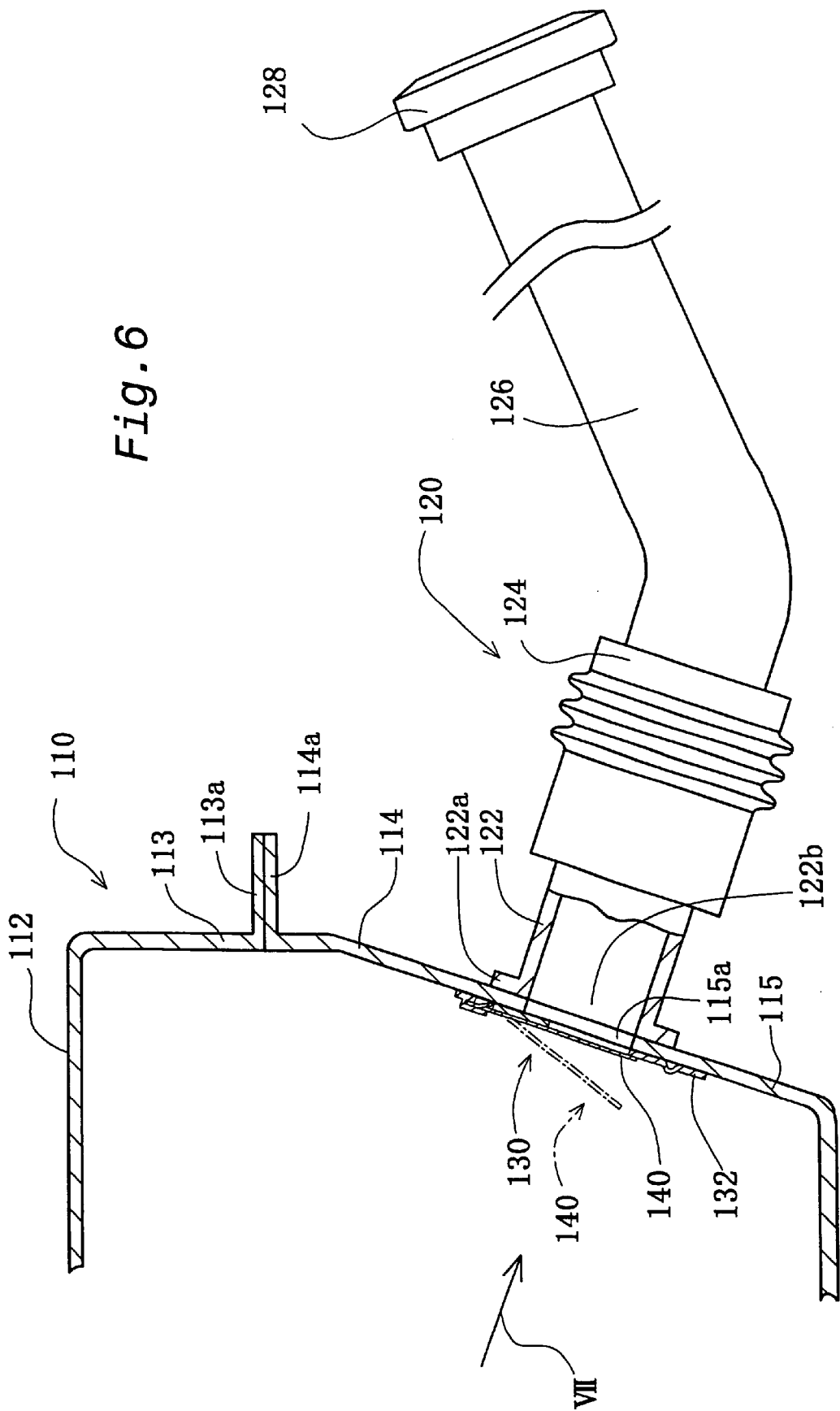
FIG. 6 is a partial view schematically illustrating another fuel tank of an automobile with a check valve of a second embodiment according to the present invention.

FIG. 6 is a partly omitted view schematically illustrating fuel tank 110 of an automobile of a second embodiment according to the present invention. Referring to FIG. 6, the fuel tank 110 includes a main body 112, in which fuel is kept, and a fueling mechanism 120 that functions as the fuel inlet pipe of the present invention to fill the main body 112 with a supply of fuel. The main body 112 is made of a metal and includes an upper tank section 113 and a lower tank section 114, which are joined with each other via flanges 113a and 114a, welded to form an integral body. The fueling mechanism 120 includes an inlet lower pipe 122 welded to a side wall 115 of the lower tank section 114, a bellows inlet hose 124 having one end open to receive a first end of the inlet lower pipe 122 fit therein, an inlet filler pipe 126 fit in the second end of the inlet hose 124, and a filler cap 128 covering a filler opening of the inlet filler pipe 126.

The second end of the inlet lower pipe 122 is positioned at an opening 115a of the side wall 115 and welded to the outer surface of the side wall 115 via a flange 122a. A check valve 130 is then positioned at the opening 115a and is attached to the inner surface of the side wall 115. The check valve 130 is set in an open position during fueling and is otherwise kept in a closed position.

In the fueling mechanism 120 of the above configuration, when a supply of fuel is fed from a filler gun (not shown) to the inlet filler pipe 126 with the filler cap 128 opened, the supply of fuel flows through the inlet hose 124 and the inlet lower pipe 122 to the check valve 130 and opens the check valve 130 to flow into the main body 112. The check valve 130 is kept in the closed position, except during fueling. Even when the filler cap 128 is removed accidentally, the check valve 130 thus effectively prevents the liquid fuel and fuel vapors in the main body 112 from flowing back and being released to the outside.

Figure 7:
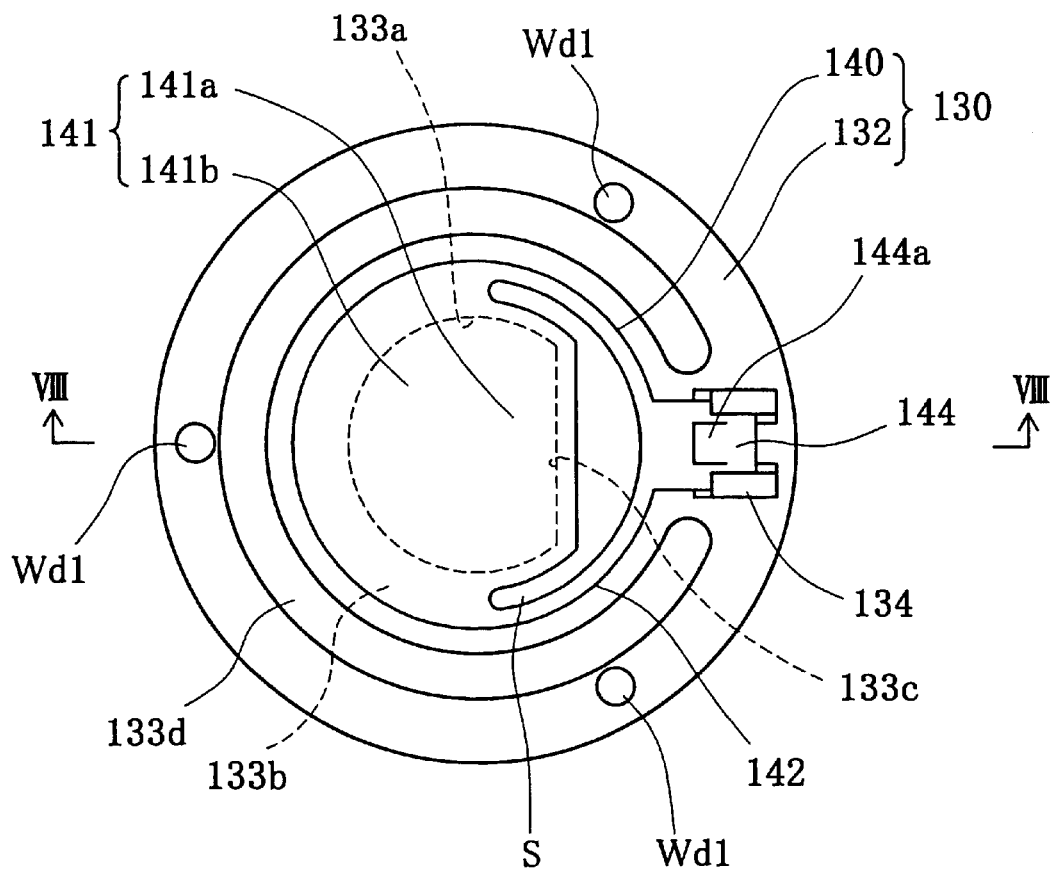
FIG. 7 is a plan view showing the check valve of the second embodiment from the presence of an arrow VIII of FIG. 6.
Figure 8:
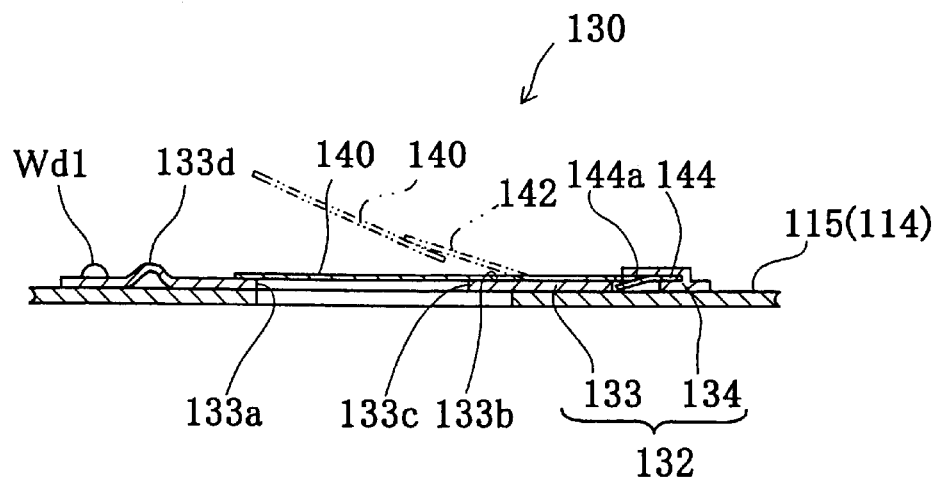
FIG. 8 is a sectional view illustrating the check valve of the second embodiment, taken along on the line VIII—VIII in FIG. 7.
Figure 9:
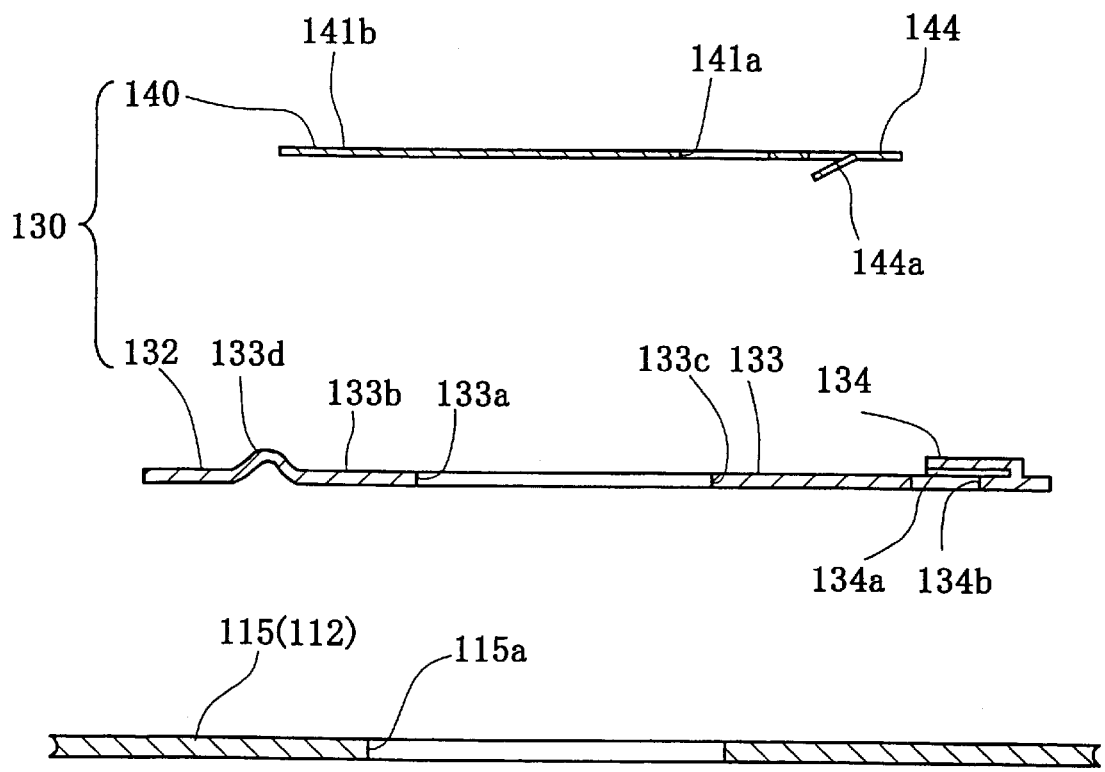
FIG. 9 is a decomposed sectional view illustrating the check valve of the second embodiment before being assembled.

The following describes the structure and the operation of the check valve 130 of the second embodiment in detail. FIG. 7 is a plan view showing the check valve 130 seen from an arrow VIII of FIG. 6; FIG. 8 is a sectional view illustrating the check valve 130, taken on the line VIII—VIII in FIG. 7; and FIG. 9 is a decomposed sectional view illustrating the check valve 130 before being assembled. Referring to FIGS. 7 through 9, the check valve 130 includes a disc-shaped metal fixation member 132 and a valve plate 140 that is attached to one end of the fixation member 132 and is movable between an open position and a closed position to open and close a valve opening 133a.

The fixation member 132 has an attachment body 133 welded to the side wall 115 of the main body 112 and an engagement 134 protruded from one end of the attachment body 133. The attachment body 133 has the valve opening 133a, which communicates with the opening 115a of the main body 112. The valve opening 133a has an arc shape defined by a linear end 133c as a chord, as shown by the dotted line in FIG. 7. The circumference of the valve opening 133a forms a seat 133b on which the valve plate 140 is seated. A circular protection step 133d is formed around the seat 133b, except where the engagement 134 protrudes inward in the main body 112. The circular protection step 133d forms a ridge to protect the valve plate 140 as discussed later.

The engagement 134 has an L-shape and protrudes from one end of the attachment body 133. The engagement 134 has an engagement recess 134a, which is defined by the upper surface of the attachment body 133 and the L-shaped portion of the engagement 134, which receives one end of the valve plate 140 therein. An engagement aperture 134b is formed in the attachment body 133 and located below the L-shaped portion of the engagement 134 in order to prevent the valve plate 140 from slipping off.

The following describes the detailed structure of the valve plate 140. As shown in FIG. 7, the valve plate 140, manufactured by press cutting a thin plate, includes a valve element 141, an arm 142, and an attachment 144, which are integrally formed as a leaf spring. The valve element 141 has substantially the same shape as the contour of the seat 133*b* on the circumference of the valve opening 133*a*, and is designed to be seated on and removed from the seat 133*b* to close and open the valve opening 133*a*. The valve element 141 includes a linear portion 141*a* and an arc portion 141*b*. The semicircular arm 142 is arranged on the circumference of the valve element 141 across a predetermined space S. The arm 142 is integrated with the valve element 141 on both ends of the valve element 141. In FIG. 8, the solid line shows the valve plate 140 in the closed position, whereas the one-dot chain line shows the valve plate 140 in the open position.

Figure 10:
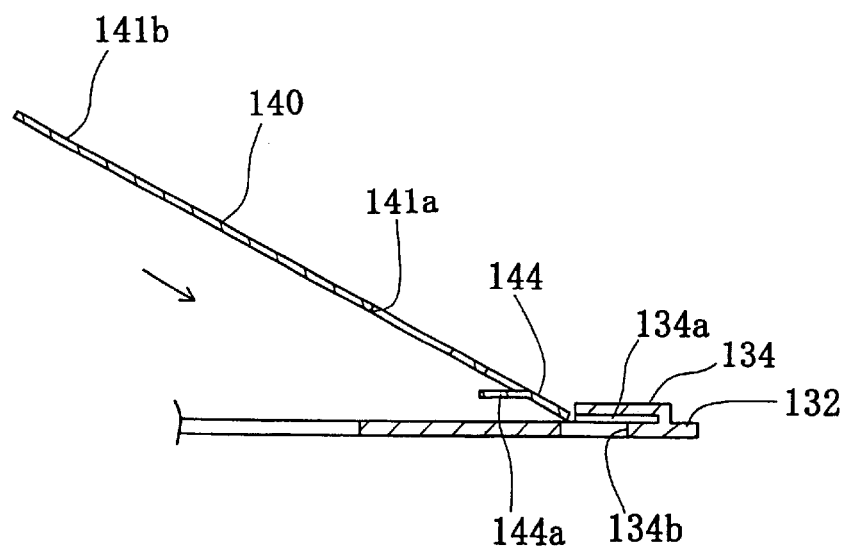
FIG. 10 shows a process of attaching a valve plate to a fixation member.

The valve plate 140 also has the attachment 144, which is a rectangular piece that extends outward from the center portion of the arm 142. The attachment 144 has a U-shaped claw 144*a*, which is obtained by cutting and bending a substantial center of the attachment 144. The attachment 144 fits in and is supported by the engagement 134 of the fixation member 132. FIG. 10 shows a process of attaching the valve plate 140 to the fixation member 132. The attachment 144 of the valve plate 140 is inserted into the engagement recess 134*a* of the fixation member 132. At this moment, the U-shaped claw 144*a* is compressed by the engagement recess 134*a* and is thereby fit into the engagement aperture 134*b*. This arrangement causes one end of the valve plate 140 to be securely attached to the fixation member 132, as shown in FIG. 8.

The operation of the check valve 130 is described in detail. During fueling, a supply of fuel, which is fed through the filler opening of the fueling mechanism 120, flows through the inlet lower pipe 122 to reach a fuel outlet 122*b* and presses the valve element 141 of the valve plate 140. Since the attachment 144 of the valve plate 140 is attached to the engagement 134 of the fixation member 132 as discussed above (as shown by the one-dot chain line in FIG. 8), the flow of fuel presses the valve element 141 and applies a force of inclining the arm 142 to open the valve opening 133*a*. This enables the supply of fuel to flow into the main body 112. When the force applied to the valve element 141 by the flow of fuel becomes smaller than the pressing force by the arm 142, the valve element 141 is not caught by the seat 133*b* by the function of the linear portion 141*a* of the valve element 141, but is smoothly seated on the seat 133*b* to close the valve opening 133*a*.

Since the valve element 141 of the valve plate 140 is joined with the attachment 144 via the narrow arm 142, the valve element 141 inclines the arm 142 and opens the valve opening 133*a*. This arrangement ensures a relatively wide opening space of the valve opening 133*a* and enables the supply of fuel to flow through the passage of the relatively large area.

The following describes the process of attaching the check valve 130 to the main body 112. As shown in FIG. 10, the attachment 144 of the valve plate 140 is pressed into the engagement recess 134*a* of the engagement 134. The claw 144*a* is then compressed in the engagement recess 134*a* and fit into the engagement apertures 134*b*. The valve plate 140 is thus integrally joined with the fixation member 132. The claw 144*a* functions to prevent the valve plate 140 from slipping off the fixation member 132.

While the upper tank section 113 and the lower tank section 114 are not joined with each other, the fixation member 132 of the check valve 130 is positioned at the opening 115*a* of the side wall 115 of the lower tank section 114. In this state, the fixation member 132 is spot welded to the sidewall 115. The spot welding is carried out at three points that are shown as spot welding points Wd1 in FIG. 7 and arranged at an interval along the circumference of the fixation member 132. This causes the check valve 130 to be securely attached to the side wall 115 of the lower tank section 114. The main body 112 is then formed by welding the upper tank section 113 to the lower tank section 114 via the flanges 113*a* and 114*a*.

The check valve 130 of this embodiment has the following effects:

(1) Since the check valve 130 is securely attached to the side wall 115 by simply welding the fixation member 132 integrated with the valve plate 140 to the side wall 115 of the main body 112, the arrangement of the embodiment facilitates the process of attachment.

(2) Since the check valve 130, which mainly consists of two parts, the fixation member 132 and the valve plate 140, this structure reduces the required number of parts and thereby lowers the manufacturing cost, compared with the prior art check valve.

(3) Since the circular protection step 133*d*, which is formed to surround the valve plate 140 is protruded inward from the plane of the valve plate 140 in the main body 112, this arrangement effectively prevents the valve plate 140 from being touched and deformed during welding the fixation member 132 or during the delivery of the check valve 130. This arrangement also attains the secure seal of the valve plate 140.

(4) The valve plate 140 is securely attached to the fixation member 132 simply by pressing the attachment 144 of the valve plate 140 into the engagement recess 134*a* of the fixation member 132. The claw 144*a* is fit in the engagement aperture 134*b*, in order to prevent the valve plate 140 from slipping off the fixation member 132.

(5) Since the spring, which is formed by the narrow arm 142 generates a force applied in the valve-closing direction, enables a small valve-opening force to be sufficient for the valve opening operation, while ensuring the high sealing properties.

Figure 11:
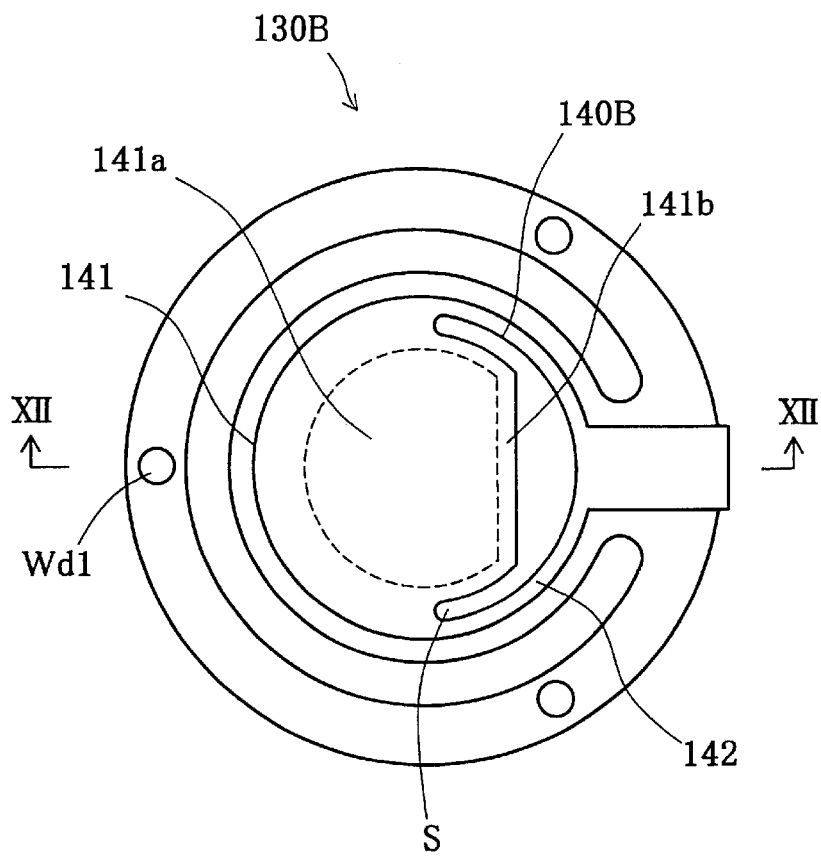
FIG. 11 is a plan view illustrating another check valve according to a modification of the second embodiment.
Figure 12:
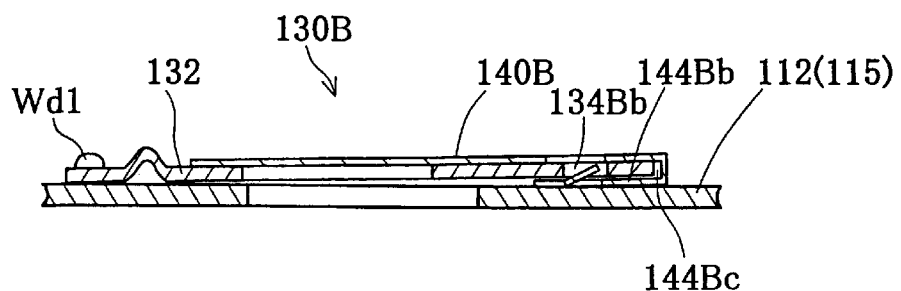
FIG. 12 is a sectional view illustrating the check valve of FIG. 11, taken on the line XII—XII in FIG. 11.
Figure 13:
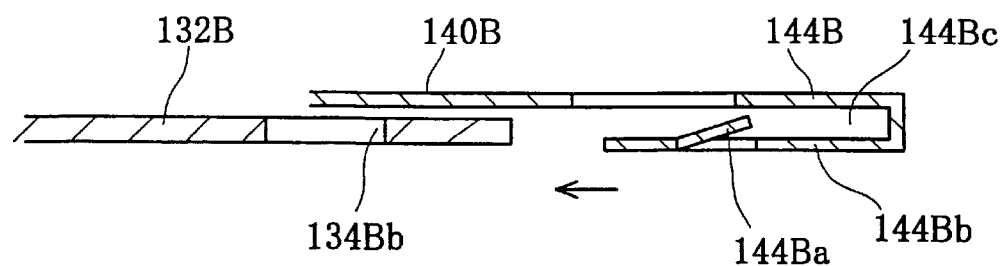
FIG. 13 is a decomposed sectional view illustrating the check valve of FIG. 11 before being assembled.

FIGS. 11 through 13 show a check valve 130B as one modification of the second embodiment. FIG. 11 is a plan view showing the check valve 130B; FIG. 12 is a sectional view showing the check valve 130B, taken on the line XII—XII in FIG. 11; and FIG. 13 is a sectional view showing the check valve 130B before being assembled. In the check valve 130B of this modified example, a valve plate 140B has a different attachment structure from that of the valve plate 140 shown in FIG. 6. An attachment 144B of the valve plate 140B has a grip 144Bc, which is bent to a U shape to receive an end of a fixation member 132B. The grip 144Bc has a lower extension 144Bb, which is partly cut and bent to form a claw 144Ba.

The process of attaching the valve plate 140B to the fixation member 132B is described briefly with reference to FIG. 13. The end of the fixation member 132B is pressed into the grip 144Bc of the valve plate 140B. This causes the grip 144Bc of the valve plate 140B to grip the end of the fixation member 132B. The claw 144Ba is pressed down and fitted into an engagement apertures 134Bb of the fixation member 132B. This causes the valve plate 140B to be securely attached to the fixation member 132B. The check valve 130B, which is the integral body of the valve plate 140B and the fixation member 132B, is attached to the main body 112 by welding the circumference of the fixation member 132B to the side wall 115 of the main body 112. In the check valve 130B of this modified structure, the lower extension 144Bb is held between the side wall 115 and the fixation member 132B. The check valve 130B is thus securely attached to the main body 112, even when the valve plate 140B receives a relatively large force generated by the flow of fuel.

Figure 14:
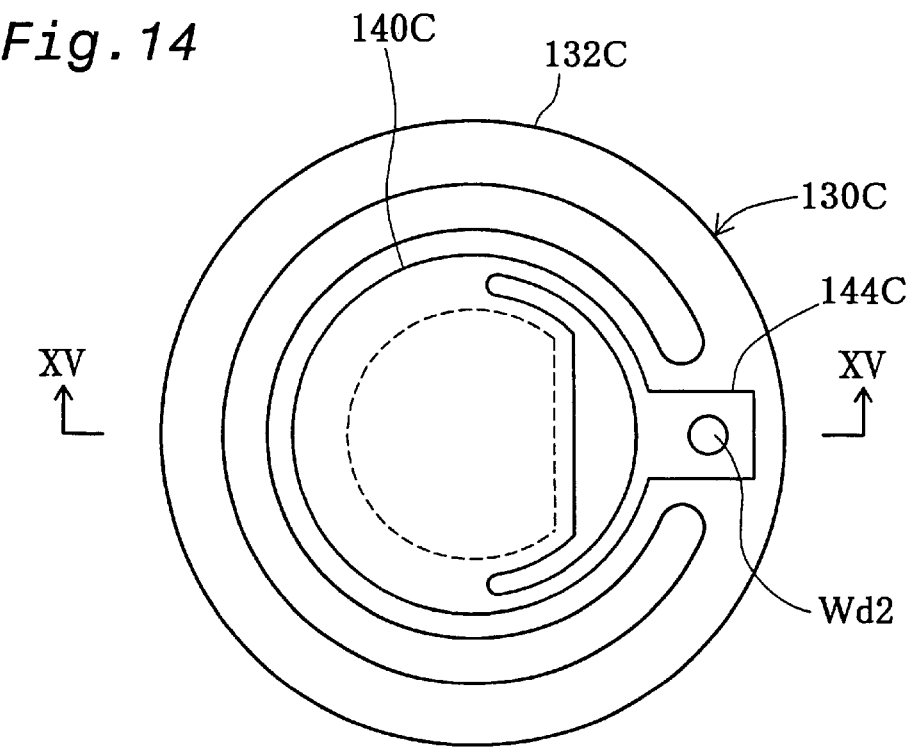
FIG. 14 is a plan view illustrating another check valve according to another modification of the second embodiment.
Figure 15:
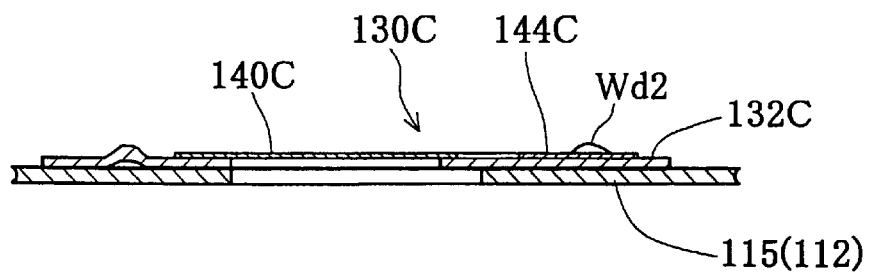
FIG. 15 is a sectional view illustrating the check valve of FIG. 14, taken on the line XV—XV in FIG. 14.
Figure 16:
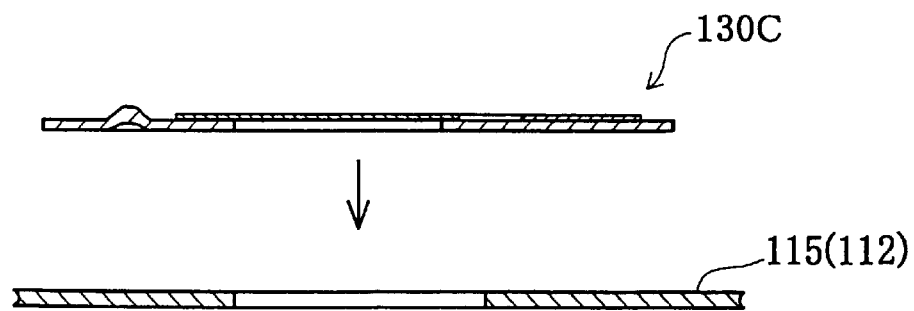
FIG. 16 is a decomposed sectional view illustrating the check valve of FIG. 14 before being fixed to a side wall of a main body.

FIGS. 14 through 16 show a check valve 130C as another modification of the second embodiment. FIG. 14 is a plan view showing the check valve 130C; FIG. 15 is a sectional view showing the check valve 130C, taken on the line XV—XV in FIG. 14; and FIG. 16 is a sectional view showing the check valve 130C before being attached to the side wall 115 of the main body 112. In the check valve 130C of this modified example, a valve plate 140C has a different attachment structure from that of the valve plate 140 shown in FIG. 6. The valve plate 140C has an attachment 144C on one end thereof, which is welded to a fixation member 132C. Namely the valve plate 140C is attached to the fixation member 132C by spot welding the attachment 144C of the valve plate 140C to the fixation member 132C. The spot welding point is shown as Wd2 in FIG. 14. The check valve 130C, which is the integral body of the valve plate 140C and the fixation member 132C, is attached to the main body 112 by welding the circumference of the fixation member 132C to the side wall 115 of the main body 112. It is preferable to use a positioning member in order to position the valve plate 140C relative to the fixation member 132C before the valve plate 140C is welded to the fixation member 132C.

Figure 17:
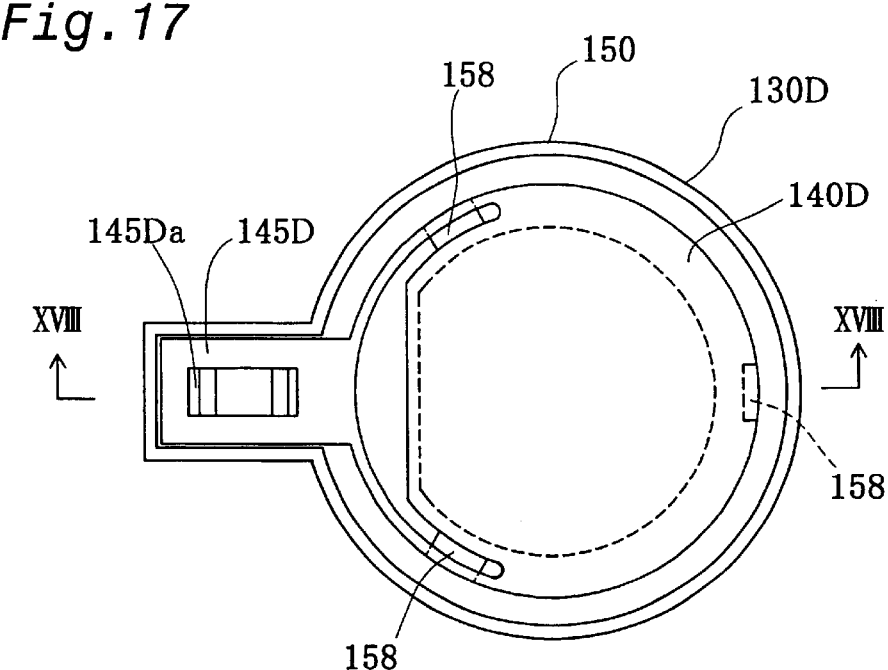
FIG. 17 is a plan view illustrating another check valve according to another modification of the second embodiment.
Figure 18:
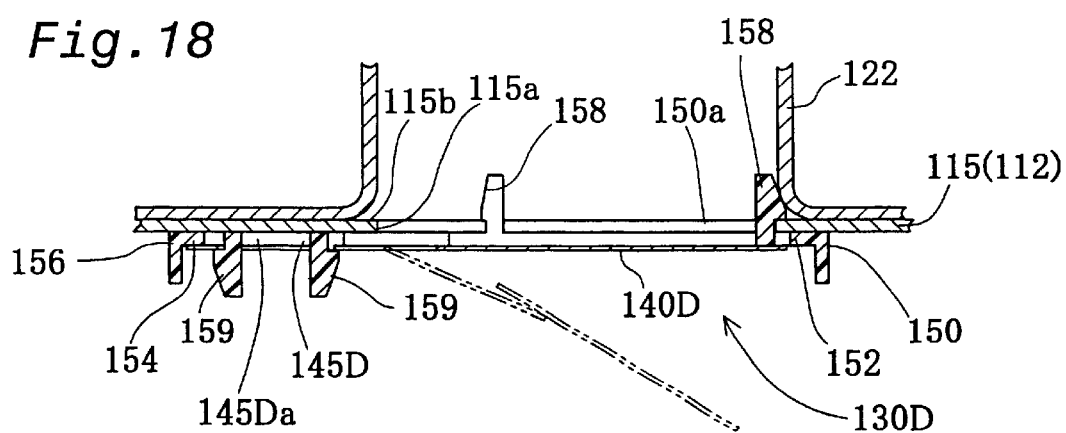
FIG. 18 is a sectional view illustrating the check valve of FIG. 17, taken on the line XVIII—XVIII in FIG. 17
Figure 19:
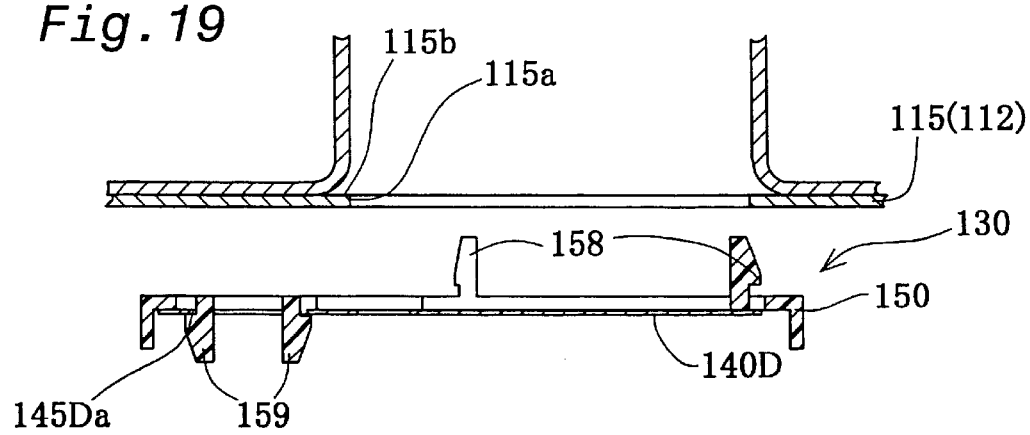
FIG. 19 is a decomposed sectional view illustrating the check valve of FIG. 17 before being attached to a side wall of a main body.
Figure 20:
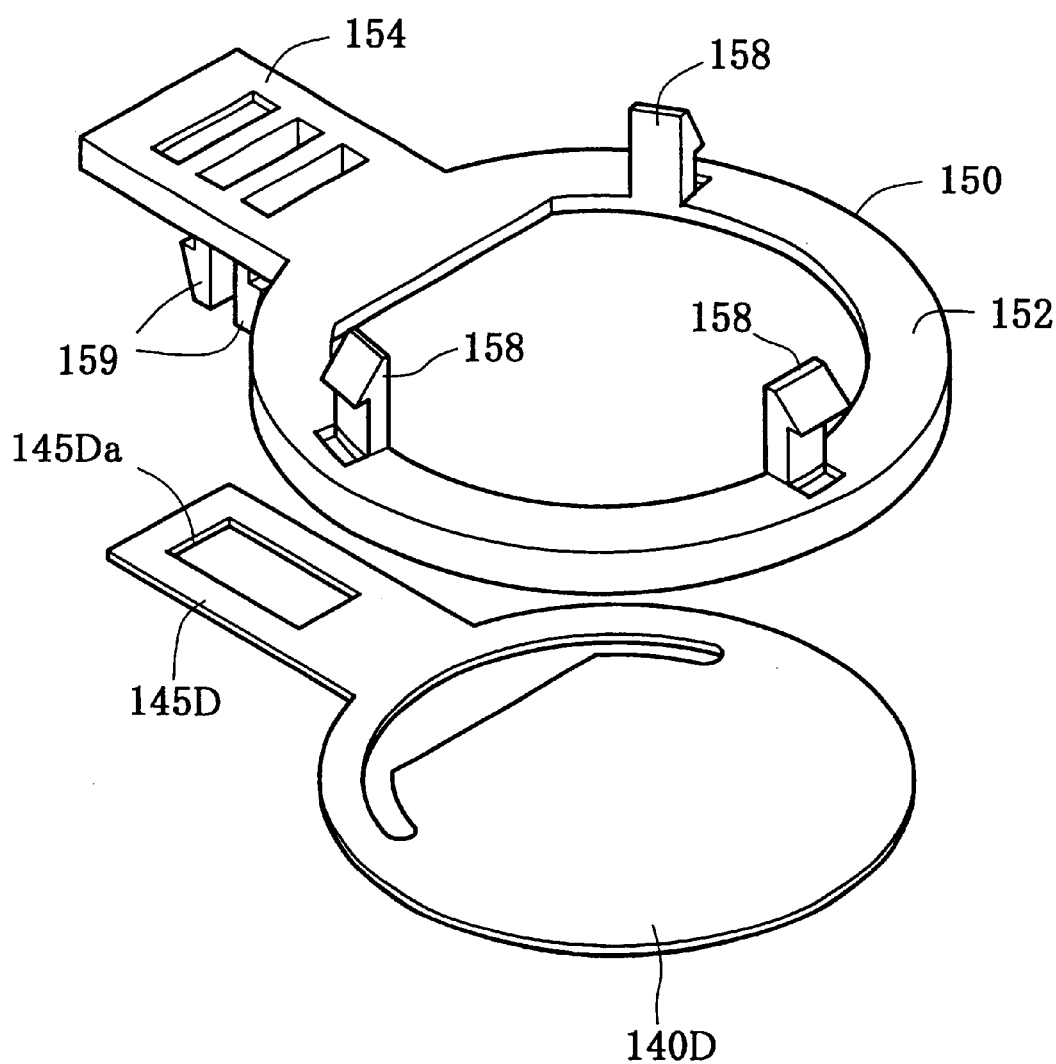
FIG. 20 is a decomposed perspective view illustrating the check valve of FIG. 17.

FIGS. 17 through 20 show a check valve 130D as still another modification of the second embodiment. FIG. 17 is a plan view showing the check valve 130D; FIG. 18 is a sectional view showing the check valve 130D, taken on the line XVIII—XVIII in FIG. 17; FIG. 19 is a sectional view showing the check valve 130D before being attached to the side wall 115 of the main body 112; and FIG. 20 is a decomposed perspective view showing the check valve 130D. The check valve 130D has an attachment structure, which is applicable to the main body 112 made of a resin. The check valve 130D has a fixation member 150 with a valve opening 150a and a valve plate 140D attached to the fixation member 150. The fixation member 150 is made of a synthetic resin having a fuel resistance, for example, polyacetal or polyamide. The fixation member 150 has a circular attachment 152 and a rectangular support 154, which are formed integrally. The support 154 extends outward from one end of the attachment 152 to support the valve plate 140D. A circular protection step 156 is formed around the attachment 152 and the support 154. The circular protection step 156 protrudes downward (in the drawing) to protect the valve plate 140D.

Three attachment pawls 158 protrude upward (in the drawing) from the inner circumference of the attachment 152 along the valve opening 150a and are arranged at intervals of 120 degrees. The attachment pawls 158 engage with a circumferential part 115b of an opening 115a formed in the side wall 115 so that the check valve 130D is securely attached to the side wall 115 of the main body 112. The support 154 has two valve pawls 159 that are protruded downward (in the drawing) to hold the valve plate 140D. The valve plate 140D has a valve attachment 145D. The valve attachment 145D has an engagement aperture 145Da, in to which the valve pawls 159 are fitted.

The process of attaching the valve plate 140 to the fixation member 150 is briefly described with reference to FIGS. 19 and 20. The valve pawls 159 of the fixation member 150 are pressed into the engagement aperture 145Da of the valve plate 140D. The valve pawls 159 are expanded at a position exceeding the engagement aperture 145Da to hold the valve plate 140D. This arrangement enables the valve plate 140D to be securely held by the fixation member 150.

The check valve 130D assembled in the above manner is attached to the main body 112 by inserting the attachment pawls 158 of the fixation member 150 into the opening 115a of the side wall 115 of the main body 112 and making the attachment pawls 158 engage with the circumferential part 115b of the opening 115a.

The configuration of the check valve 130D enables the resin fixation member 150 to be securely attached to the main body 112, which is also made of a resin and does not allow welding. The valve plate 140D is positioned by the valve pawls 159 at the support 154 of the fixation member 150 and securely attached to the fixation member 150.

Figure 21:
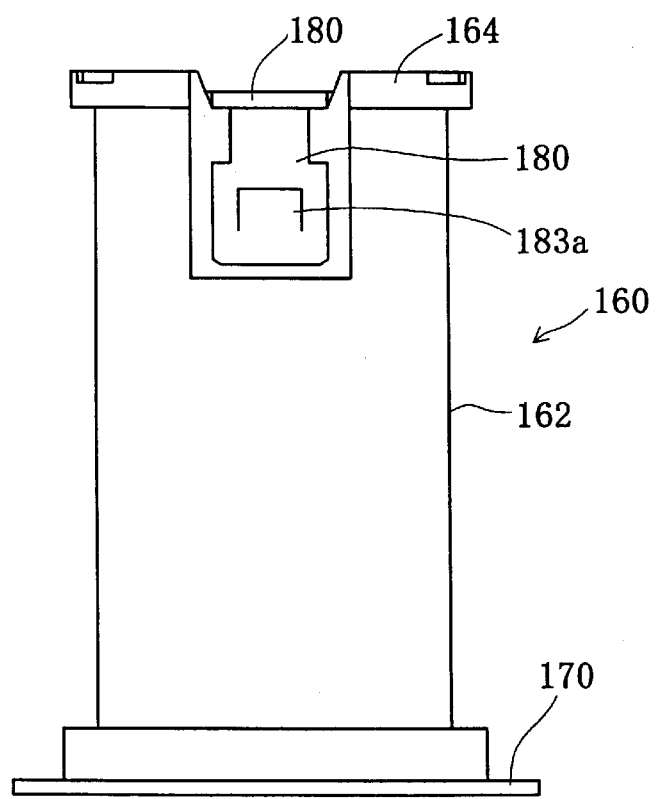
FIG. 21 is a side view schematically illustrating a check valve of a third embodiment according to the present invention.
Figure 22:
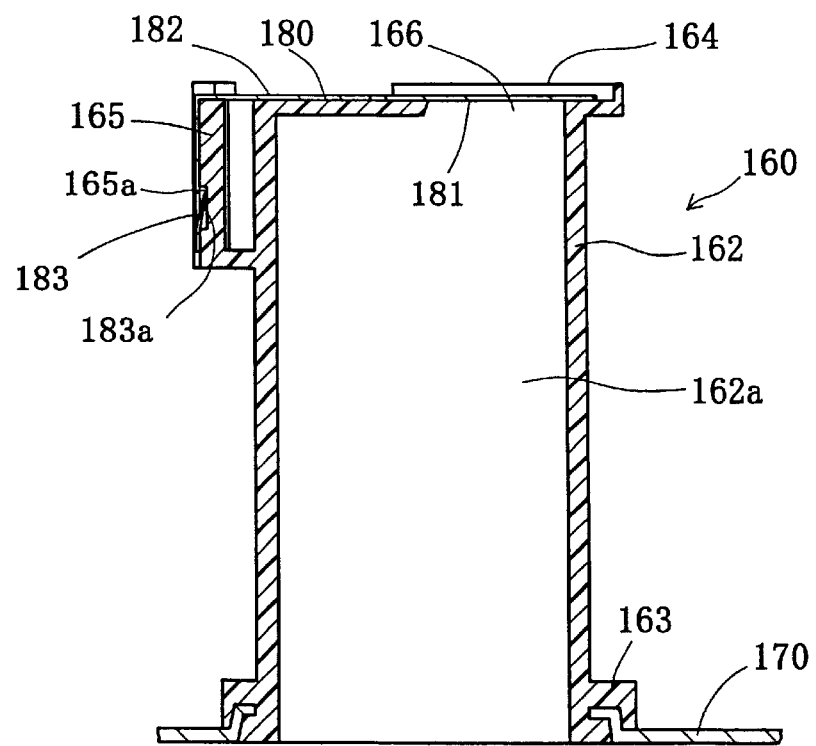
FIG. 22 is a sectional view showing the check valve of FIG. 21.

FIG. 21 is a side view illustrating a check valve 160 of a third embodiment according to the present invention, and FIG. 22 is a sectional view showing the check valve 160. Referring to FIGS. 21 and 22, the check valve 160 is welded and attached to a main body (not shown) via a metal attachment plate 170, which is mounted on a lower end of a tubular casing 162. The check valve 160 includes the casing 162, the attachment plate 170, and a valve plate 180. The valve plate 180 has a valve element 181, an arm 182, and an attachment 183. The tubular casing 162 is made of a resin and has a valve chest 162a. A flange 163 is formed on the lower end of the casing 162 to receive the metal attachment plate 170 inserted therein. The upper end of the casing 162 has a fuel outlet 166, which is opened and closed by the valve plate 180. A circular protecting projection 164 is also formed on the upper end of the casing 162 to protect the valve plate 180. A valve support 165 with a support recess 165a is formed on an upper side portion of the casing 162. The valve support 165 holds the attachment 183 of the valve plate 180 and supports the whole valve plate 180 via a claw 183a fit in the support recess 165a. The check valve 160, which is the integral body of the valve plate 180, the tubular casing 162, and the attachment plate 170, are welded and attached to the main body.

The present invention is not restricted to the above embodiments or their modifications, but there may be many other modifications, changes, and alterations without departing from the scope or spirit of the main characteristics of the present invention. Some examples of possible modification are given below.

(1) The valve element of the valve plate may have any shape corresponding to the shape of the fuel conduit, for example, a circle or a sector, which is a section of a circle, as well as a polygon like triangle or rectangle.

(2) In the above embodiments, the valve plate is made of stainless steel, but may be made of any material having spring characteristics, for example, a resin.

The scope and spirit of the present invention are limited only by the terms of the appended claims.

What is claimed is:

1. A check valve attached to an inner wall of a main body of a fuel tank, said check valve comprising:

a casing having a fuel inlet and fuel outlet through which a supply of fuel is ejected from said valve casing to said main body;

a valve disc for opening said fuel outlet only when sufficient fuel pressure is applied to said valve disc from said fuel inlet; and a fixation plate surrounding said casing and having said inner end and an outer end for hermetically sealing the main body, the inner end being inserted through insert molding into an end of said casing, said outer end being arranged to be welded to said inner wall of said main body.

2. A check valve according to claim 1, wherein said casing has a ringshaped seal projection made of resin that protrudes to surround said fuel outlet, said ring-shaped seal projection being pressed against and jammed to a side wall of said main body, thereby ensuring a seal of said main body from said fuel inlet.

3. A check valve according to claim 1, wherein said fixation plate has a handle formed on a circumference thereof, said handle being arranged to be held when said check valve is attached to said main body.

4. A check valve according to claim 1, further comprising a spring that presses said valve disc to close said fuel outlet.

5. A check valve according to claim 1, wherein said casing has a seat, and wherein said valve disc comprises a valve element seated on said seat in a closed position and removed from said seat in an open position to close and open said fuel outlet;

an arm linked with said valve element; and an attachment connected with said arm and attaches said valve disc to said casing, wherein said valve element, said arm, and said attachment are integrally formed from a thin elastic plate, and wherein said arm presses said valve element against said seat to cause said valve element to be seated on said seat in said closed position, said arm causing said valve element to be removed from said seat and thereby setting said valve element in said open position when said valve element receives a pressure of a flow of fuel applied thereto during fueling.

6. A fuel tank comprising:

a main body, in which fuel is kept; and a fuel inlet pipe connected to said main body and through which a supply of fuel flows into said main body, said fuel tank being provided with a check valve attached to an inner wall of said main body and connected to a fuel conduit of said fuel inlet pipe, said check valve preventing liquid fuel and fuel vapors in said main body from flowing through said fuel inlet pipe and being released to the outside, said check valve being opened by a flow of fuel in said fuel inlet pipe to allow said flow of fuel to be introduced into said main body of said fuel tank, wherein said check valve comprises a casing having a fuel inlet and an fuel outlet through which a supply of fuel is ejected from said casing into said main body;

a valve disc for opening an outer end only when sufficient fuel pressure is applied to said valve disc by said fuel inlet pipe; and said fixation plate surrounding said casing and having an inner end and an outer end, said inner end being inserted through insert molding into an end of said casing, said outer end being welded to an inner wall of said main body.

* * * * *